(12) United States Patent
Hodges et al.

(10) Patent No.: US 10,122,827 B2
(45) Date of Patent: Nov. 6, 2018

(54) INTERACTION BETWEEN DEVICES DISPLAYING APPLICATION STATUS INFORMATION

(71) Applicant: Microsoft Technology Licensing, LLC, Redmond, WA (US)

(72) Inventors: Stephen E Hodges, Cambridge (GB); John Helmes, Tegelen (NL); James W Scott, Cambridge (GB); Nicolas Villar, Cambridge (GB); Stuart Taylor, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 313 days.

(21) Appl. No.: 13/775,877

(22) Filed: Feb. 25, 2013

(65) Prior Publication Data

US 2014/0244715 A1   Aug. 28, 2014

(51) Int. Cl.
*G06F 15/16* (2006.01)
*H04L 29/06* (2006.01)
(Continued)

(52) U.S. Cl.
CPC .............. *H04L 67/42* (2013.01); *G06F 9/542* (2013.01); *H04L 43/0817* (2013.01);
(Continued)

(58) Field of Classification Search
CPC .................................................. H04L 43/0817
(Continued)

(56) References Cited

U.S. PATENT DOCUMENTS 7,685,257 B2   3/2010 King et al.
8,065,628 B2   11/2011 Oshiro et al.
(Continued)

FOREIGN PATENT DOCUMENTS

CN   1343933 A    4/2002
CN   101087397 A   12/2007
(Continued)

OTHER PUBLICATIONS

Foley, Mary Jo, "Microsoft's Windows Phone 8 has Live Tiles and Live Apps", Published on: Oct. 29, 2012, Available at: http://www.zdnet.com/microsofts-windows-phone-8-has-live-tiles-and-live-apps-7000006545/.
(Continued)

*Primary Examiner* — Jason D Recek

(57) ABSTRACT

Methods and apparatus for displaying dynamic status information on a plurality of devices and enabling interactions between these devices are described. In an embodiment, a trigger signal is sent to one or more computing devices to trigger the launch of an application client on the computing device. The trigger signal is generated on another device in response to a user interacting with the displayed status information. This other device may be an impoverished device which displays status information for an application but is not capable of running the application client. In various embodiments, the status information is displayed in the form of a GUI element called a tile and this status information may be pushed to the device by a proxy server. The trigger signal may be sent to multiple devices or in some embodiments, a computing device may be selected to receive the trigger signal.

20 Claims, 9 Drawing Sheets

(51) Int. Cl.
*H04L 12/26* (2006.01)
*H04L 29/08* (2006.01)
*G06F 9/54* (2006.01)

(52) U.S. Cl.
CPC .......... *H04L 67/2823* (2013.01); *H04L 67/36* (2013.01); *G06F 2209/544* (2013.01); *G06F 2209/545* (2013.01)

(58) Field of Classification Search
USPC .......................................... 709/203, 208–209
See application file for complete search history.

(56) References Cited

U.S. PATENT DOCUMENTS

| | | |
|---|---|---|
| 8,285,259 B2 | 10/2012 | Karkanias et al. |
| 2003/0088621 A1* | 5/2003 | Martinez ........... H04L 29/06027 709/204 |
| 2008/0052367 A1* | 2/2008 | Liu ..................... G06F 9/44505 709/208 |
| 2011/0162035 A1* | 6/2011 | King ..................... G06F 1/1632 726/1 |
| 2011/0270931 A1* | 11/2011 | Cheng et al. ................. 709/206 |
| 2012/0198268 A1 | 8/2012 | Qureshi |
| 2012/0214593 A1 | 8/2012 | Haltovsky et al. |
| 2012/0290663 A1* | 11/2012 | Hsieh et al. .................. 709/206 |
| 2013/0031618 A1* | 1/2013 | Momchilov ...................... 726/7 |
| 2013/0042310 A1* | 2/2013 | Najafi ..................... G06F 21/31 726/7 |
| 2013/0132501 A1* | 5/2013 | Vandwalle et al. ........... 709/208 |
| 2013/0132556 A1* | 5/2013 | DeLuca .................. H04L 43/08 709/224 |
| 2013/0222323 A1* | 8/2013 | McKenzie .................... 345/174 |
| 2014/0088969 A1* | 3/2014 | Verna ................ H04M 1/72522 704/260 |
| 2014/0129910 A1* | 5/2014 | Kota ..................... G06F 17/211 715/202 |

FOREIGN PATENT DOCUMENTS

| | | |
|---|---|---|
| CN | 102298536 A | 12/2011 |
| CN | 102857726 A | 1/2013 |

OTHER PUBLICATIONS

Yousuf, "Gnomio Watch—the First Watch with Windows Phone 8", Published on: Dec. 16, 2012 Available at: http://www.techinfo2.com/gnomio-watch-the-first-watch-with-windows-phone-8.html.

"Office Action Issued in European Patent Application No. 14708412.3", dated Jan. 12, 2016, 3 Pages.

"First Office Action and Search Report issued in Chinese Patent Application No. 201480010214.5", dated Jan. 19, 2018, 13 Pages.

* cited by examiner

INTERACTION BETWEEN DEVICES DISPLAYING APPLICATION STATUS INFORMATION

BACKGROUND

There are now a number of operating systems, such as Microsoft® Windows® 8 and Windows® Phone 8, which provide an interface comprising tiles with dynamic graphical elements that display status information for applications. This status information is visible to a user glancing at the display and does not require the user to open the application in order to access status information.

The embodiments described below are not limited to implementations which solve any or all of the disadvantages of known ways of displaying status information and interacting with applications.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods and apparatus for displaying dynamic status information on a plurality of devices and enabling interactions between these devices are described. In an embodiment, a trigger signal is sent to one or more computing devices to trigger the launch of an application client on the computing device. The trigger signal is generated on another device in response to a user interacting with the displayed status information. This other device may be an impoverished device which displays status information for an application but is not capable of running the application client. In various embodiments, the status information is displayed in the form of a GUI element called a tile and this status information may be pushed to the device by a proxy server. The trigger signal may be sent to multiple devices or in some embodiments, a computing device may be selected to receive the trigger signal.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
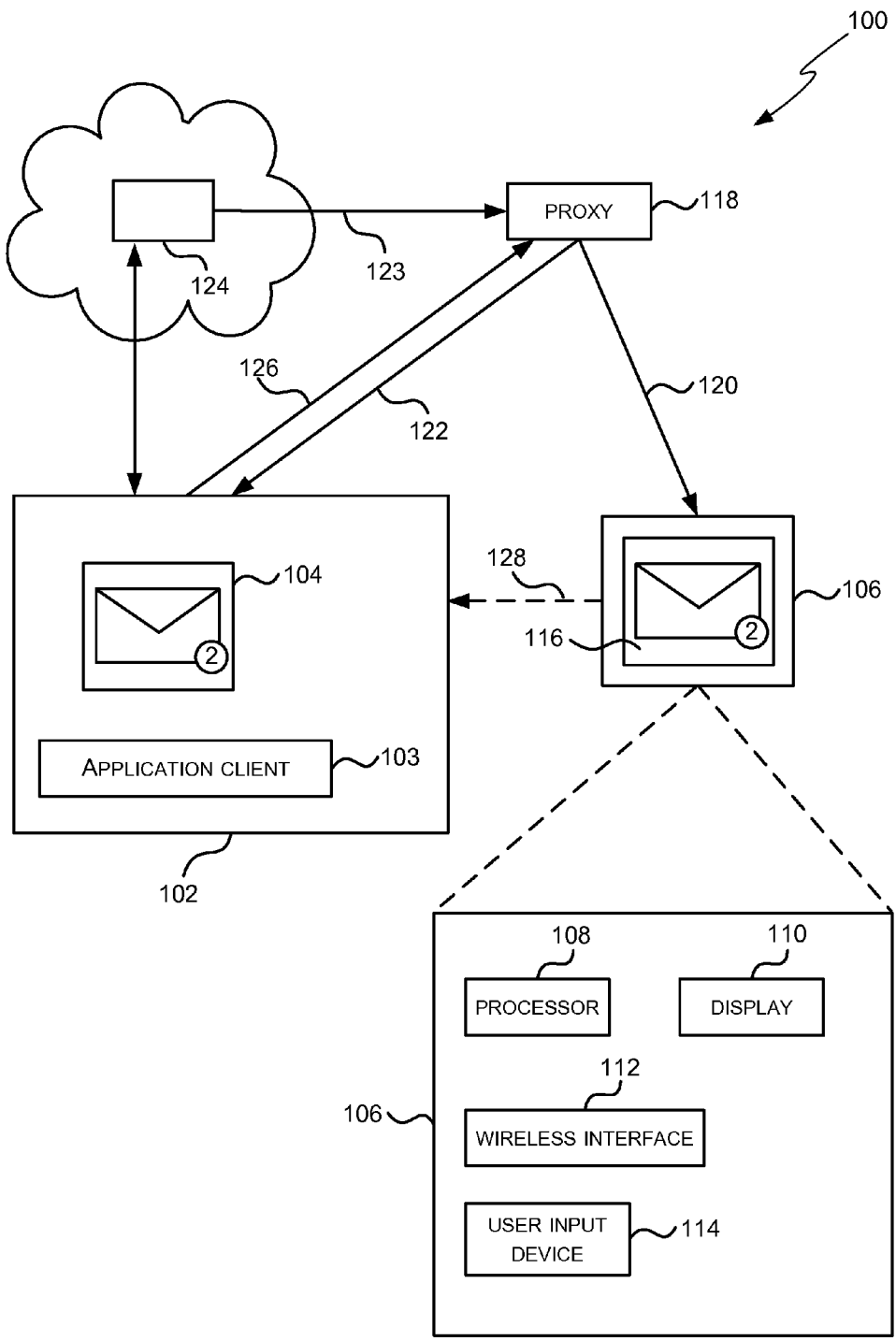
FIG. 1 is a schematic diagram of an example system which provides status update information for applications.

FIG. 1 is a schematic diagram of a system 100 which provides status update information for applications. The system 100 comprises a computing device 102 on which an application client 103 has been installed, although this application client 103 need not be currently running. This application client 103 may interact with a remote application service 124 (or multiple remote application services 124) or alternatively, both the application client 103 and the application service may be located on the computing device 100. The term 'application' is used herein to relate to the composite user experience which is provided by the combination of the application client 103 and any application services (e.g. application service 124). In this example the application is an email application, but it will be appreciated that this is provided by way of example and the application may be any type of application. In some examples, the application client 103 may be specific to the application (e.g. an email application client) and in other examples, the application may be entirely web-based (e.g. a web-based email application) and in which case the application client 103 may be a browser.

The computing device 102 may, for example, be a desktop, laptop or surface computer, smartphone, games console or other computing device. The display on the computing device 102 is arranged to display a tile 104 which provides dynamic graphical elements that display status information associated with the application. The tile 104 may also be referred to as a 'live tile' because it displays dynamic content. In the example shown in FIG. 1, this status information indicates that the user has two new email messages.

The system further comprises a hardware live tile 106 which is a hardware display device comprising a processor 108, display 110 and wireless interface 112. The hardware live tile 106 is not capable of running the application client 103 (e.g. the email application client) due to processing, memory and power constraints (i.e. the hardware live tile 106 comprises insufficient hardware resources to run the application). In particular, the hardware live tile 106 may be a low cost device and the processor 108 may be a small, low power processor or microcontroller. The display 110 may be a touch-sensitive display, thereby providing both a display and a user input device. Alternatively, where the display is not touch-sensitive (or in addition to use of a touch-sensitive display) the hardware live tile 106 may comprise a separate user input device 114 (e.g. one or more buttons). In an example, the wireless interface 112 may be a WiFi™ interface, alternatively the wireless interface 112 may use NFC, IR (infra-red), Bluetooth™ or other technology.

Although the hardware live tile 106 does not have any operating system or the ability to run applications (i.e. application clients or application services), the processor 108 is arranged to handle strings and image files (e.g. JPEG files). This means that the hardware live tile 106 is able to display status information for an application (e.g. the email application) in the form of a tile 116 if suitable strings/image files are provided via the wireless interface 112. The hardware live tile 106 is application independent as it does not replicate the application client 103 running on the computing device 102 but instead displays status information (in tile 116) provided to it via the wireless interface 112 and may, as described below, provide status update information for one or more applications.

In the system 100, a proxy device 118 (which may also be referred to as a notification service) provides the strings/image files to the hardware live tile 106 in order that it can display the status information for an application (e.g. the email application in this example). It can be seen in FIG. 1 that the status information is provided by the proxy device 118 to both the computing device 102 and the hardware live tile 106 (arrows 120 and 122), although the data is provided in different formats to the computing device 102 and hardware live tile 106 (because of the limitations of the hardware in the hardware live tile).

When there is updated status information for the application (e.g. a new email has arrived in the email application example) this information is provided (arrow 123) to the proxy device 118 from the application service 124 (e.g. the email service) which may be running remotely (i.e. this may be a cloud-based service) and which may be operated by a third party (i.e. a party other than the party operating the proxy device). The update information may be provided to the proxy device 118 along with an identifier for the application, which may be referred to herein as the application ID. This application ID is specific to the application client 103 and also to the user/application log-in (e.g. so that different users creating live tiles for the same application will have different application IDs). Within the proxy device 118, both devices (the computing device 102 and the hardware live tile 106) are associated with the application ID and hence receive the updated status information (arrows 120 and 122). As described above, different information will be sent to each of the devices, because the hardware live tile 106 will receive one or more strings/image files to enable it to display an updated tile 116, whereas the computing device 102 may receive the information in any format (e.g. it may receive the new email). In order to receive the status update information at the computing device 102, it is not necessary for the application client 103 to be running on the device (e.g. it may be closed or asleep), but the application client 103 is installed on the computing device 102.

As the status update information is provided to the hardware live tile 106 by the proxy device 118 (and not directly from the computing device 102), there is no requirement for the hardware live tile 106 to be physically close to the computing device 102 in order for the update information to be received by the hardware live tile.

In order that the updates may be received by the computing device 102 and hardware live tile 106, a channel may be kept open between the computing device 102 and the proxy device 118 and a channel may be kept open between the hardware live tile 106 and the proxy device 118. A channel may be kept open by a stub running on the computing device 102/hardware live tile 106 which sends periodic keep alive messages to the proxy device 118.

Although FIG. 1 shows the status update coming from the application service 124, in other examples, the status update information may come from the computing device 102. For example, if the status information displayed on the hardware live tile 106 (in tile 116) is the number of unread emails, when a user reads an email on the computing device 102, the number displayed in the tiles 104, 116 for that application is decremented. In such an instance the status update information may be sent to the proxy device 118 by the computing device 102 (arrow 126) and then the status update information may be sent (as described above) to those devices associated with the same application ID (arrows 120-122) or to a subset of those devices (i.e. not to the computing device 102 as the proxy device 118 is aware that this information was received from that device and in which case the local tile 104 may be updated directly by the application client 103 running on the computing device 102). In other examples, the status update may be provided directly to the hardware live tile 106 by the computing device 102 (arrow 128), e.g. via the wireless interface 112.

Figure 2:
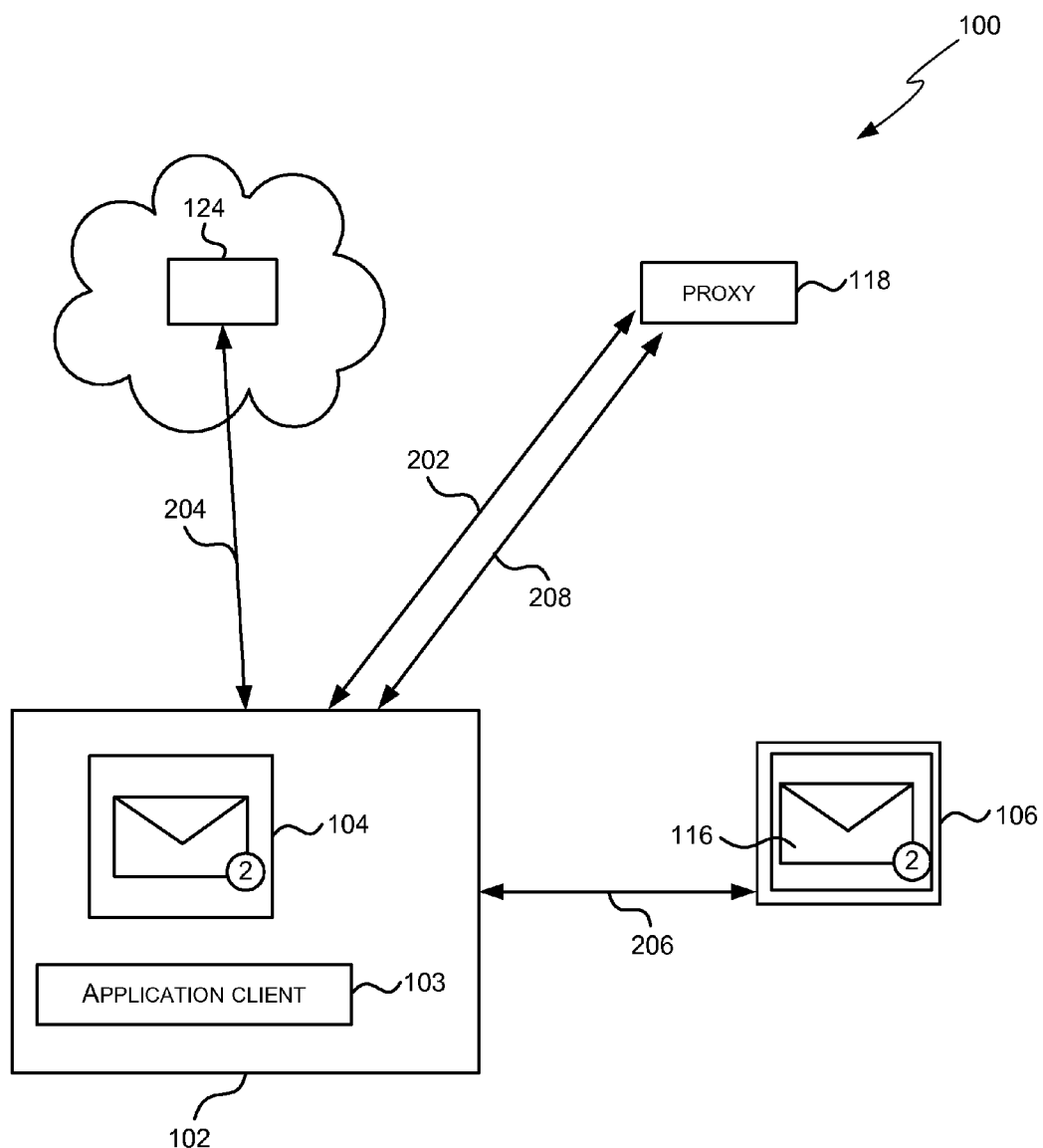
FIG. 2 is a schematic diagram showing an association method implemented in the system of FIG. 1.

In order for the system 100 of FIG. 1 to operate as described above, both the devices (the computing device 102 and hardware live tile 106) are associated with the same application ID (or otherwise linked) within the proxy device 118. FIG. 2 shows a schematic diagram of the same system 100 and illustrates an example method of creating this association or linking. When a tile 104 is created for an application client 103 running on the computing device 102, the computing device 102 communicates with the proxy device 118 (arrow 202) to obtain an identifier (ID) for the tile and this ID is passed to the application client 103 running on the computing device 102 which creates the tile 104. At this point, the computing device 102 is associated with the ID within the proxy device 118. Where the application is a web-based application and the application client 103 is a web browser, the browser may create multiple tiles, with each tile having a different application ID and being associated with a different web-based application. The application ID which has been generated by the proxy device 118 and which relates to the application client 103 and tile 104 is then passed to the external service 124 (arrow 204) so that the service 124 can provide updates to the tile 104, via the proxy device 118 (as described above with reference to FIG. 1) as and when required.

To associate the hardware live tile 106 with the same application ID in the proxy device 118, information relating to the hardware live tile 106 is transferred from the hardware live tile 106 to the computing device 102 (arrow 206). The information transferred comprises information which facilitates the association such as an identifier of the hardware live tile 106 and in some examples, authorization details (e.g. credentials for the hardware live tile 106). The transfer (arrow 206) may be achieved in many different ways and various examples are described below.

In a first example, a code (e.g. a QR code or barcode) is displayed on the hardware live tile 106 (e.g. in response to a particular user input on the hardware live tile 106 or automatically when the hardware live tile 106 is switched on) and this is captured by a camera on the computing device 102. In a second example, the information may be transferred using the wireless interface 112 and/or using NFC or IrDA (where the hardware live tile 106 has this capability). In a third example, an alphanumeric code may be displayed on the hardware live tile 106 and this may be manually entered by a user into the computing device 102 (e.g. into the application client 103 running on the computing device 102). In a fourth example, the computing device 102 may have a peripheral device which provides a docking station for a hardware live tile 106. When located in the docking station, the hardware live tile 106 may be able to transfer the information to the computing device 102 using a wired connection or any other means.

The information which is received by the computing device 102 from the hardware live tile 106 (arrow 206) is then transmitted by the computing device 102 to the proxy device 118 along with the application ID (arrow 208) and the proxy device 118 uses this information to associate the hardware live tile 106 with the application ID. If there is more than one hardware live tile in the system, this method may be repeated to associate further hardware live tiles with the same application ID.

Using the association method described above, there is no requirement for user authentication with the hardware live tile 106 (e.g. the user does not log in to that device) and in many examples, the sparse hardware of the hardware live tile 106 is such that user authentication cannot be achieved on the hardware live tile 106 itself. For example, there may be no keyboard input to the hardware live tile and only simple user interactions (e.g. press, swipe) may be enabled.

Although the hardware within the hardware live tile 106 is sparse (i.e. it only has limited processing capabilities), some user interaction with the hardware live tile 106 may be performed via the display 110 if it is touch-sensitive or via the user input device 114 where this is provided. In some examples, the hardware live tile 106 may be associated with multiple applications (e.g. by repeating the methods described above for different applications, each having a different application ID) and the hardware live tile 106 may therefore display status update information for more than one application. As described above, the hardware live tile is application independent. It receives information for all applications with which it is associated using a single overall schema (e.g. using strings and/or image files), although different applications may use different subsets of the schema. It is not necessary for the hardware live tile to install new software relating to each application.

In examples where the hardware live tile 106 is associated with multiple applications, a user may touch the hardware live tile 106 (on the touch-sensitive display or user input device) in order to switch between status update information for the different applications. In addition, or instead, there may be more than one "page" of status information within the tile 116 for each application (e.g. more than one view/image) and a user may be able to touch or otherwise interact with the hardware live tile 106 to switch between these pages. In an example, the tile 116 for an application may comprise a "front" page and a "back" page, each of which displays different status information.

In various examples, a user interaction with the hardware live tile 106 may trigger an action on the computing device 102, which may be considered the "master" device as it is the device which has (in the past) been running the application client 103, although the device need not currently be running the application client 103. This can be described with reference to FIG. 3 which comprises a schematic diagram of the system 100 of FIG. 1 and a flow diagram of an example method of interaction between the hardware live tile 106 and the computing device 102.

Figure 3:
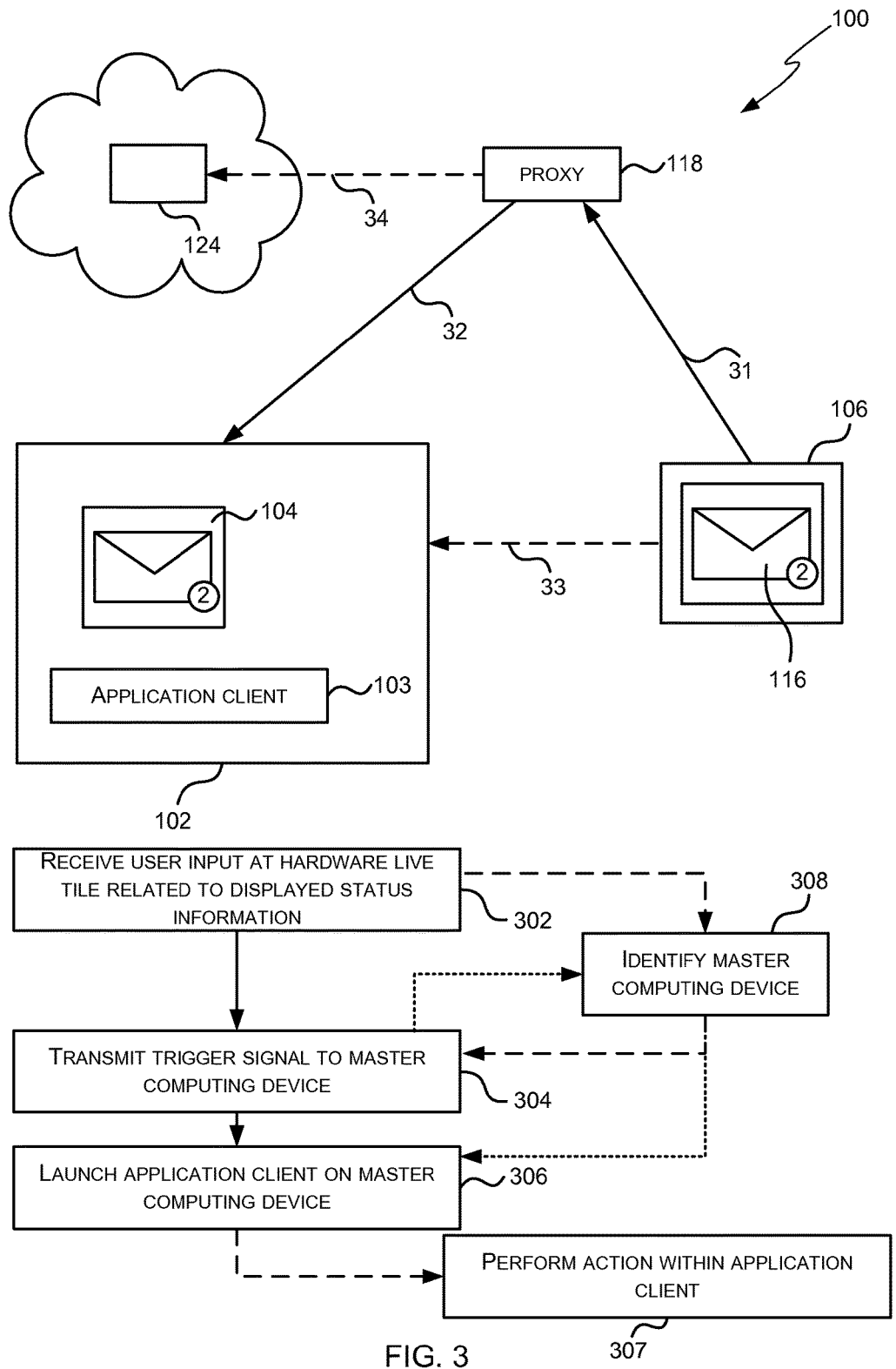
FIG. 3 is a schematic diagram and example flow chart showing a method of interaction between elements of the system of FIG. 1.

As shown in FIG. 3, in response to a user input received (in block 302) at the hardware live tile 106 (e.g. via the display 110 or user input device 114), a trigger signal is sent (in block 304) to the master computing device (computing device 102 in this example). The user input may, for example, be a swipe of the display or a press of a button.

The trigger signal may, in some examples, be sent via the proxy device 118 (arrows 31-32) and in this case may use the existing (and open) channels between the two devices 106, 102 and the proxy device 118 (which are described above). In such examples, the mechanism used by the proxy device 118 to signal to the master computing device may be similar to receiving status update information (e.g. from the application service 124) in that the information which is received by the proxy device 118 and relates to an application ID is sent to some or all of those devices which are linked with the application ID (as described above with reference to FIG. 1). In this example, however, the information may not be sent to the device from which the information is received. Alternatively a different mechanism may be used.

In other examples, the trigger signal may be sent directly from the hardware live tile 106 to the master computing device (arrow 33) and this may use the wireless interface 112 within the hardware live tile 106 or any other communication interface provided in the hardware live tile (e.g. NFC, IrDA, Bluetooth™).

In further examples, the trigger signal may be sent from the hardware live tile 106 to the application service 124 via the proxy service 118 (arrows 31 and 34). This then causes application service 124 to send updated status information to the application client 103 (e.g. using the mechanism described above with reference to FIG. 1).

In response to receiving the trigger signal, the master computing device (e.g. computing device 102) launches (in block 306) the application client 103 to which the trigger signal relates (i.e. the application client 103 which is related to the status update with which the user interacted on the hardware live tile 106). The application client 103 may, for example, be launched by the same software (the stub, as described with reference to FIG. 1) that talks to the proxy device 118 and maintains the open channel to the proxy device 118. Alternatively, there may be separate remote launching software (RLS) 405 on the master computing device.

On launching, the application client 103 may take any action (block 307) and this action may be dependent upon the trigger signal received, where the trigger signal provides an input to the application client 103 once launched (in block 306). For example, different user interaction on the hardware live tile 106 may result in different trigger signals and initiate different actions within the application client 103 on the master computing device (e.g. because different trigger signals provide different inputs to the application client 103). The user input on the hardware live tile 106 (received in block 302) may be sent to the application client 103 within the trigger signal (transmitted in block 304) and this user input on the hardware live tile 106 may then be used as a user input to the application client 103. For example, if the user used a touch tap or gesture, that touch location or gesture type and the particular status information being displayed at the time of the user input may be sent to the newly-launched application client 103 to provide some context (e.g. what message to show first in an email application client).

In some examples the newly-launched application client 103 may consult the related local tile 104 for any status updates and then communicate with the remote application service 124 to obtain further information on the updates (e.g. to download the content of the new email) and display this extra information.

It will be appreciated that in scenarios where the application client 103 on the master computing device is already running and active, the launch operation (in block 306) may have no visible effect to a user.

In examples where the hardware live tile is associated with multiple applications and therefore displays status update information for more than one application, the trigger signal identifies which application it relates to and this may be determined (by the hardware live tile) based on which status update information was being displayed at the time the user input is received (in block 302), i.e. which tile 116 was being displayed on the hardware live tile 106 at the time of the user interaction. In an example implementation, different authentication details may be provided by the hardware live tile 106 when performing the association method (as shown in FIG. 2) for different applications and these authentication details (e.g. credentials) may be stored by the application client 103 and/or the proxy device 118. Some/all of these authentication details may be provided within a trigger signal to enable the receiving device (e.g. the proxy device 118 or master computing device) to determine to which application the trigger relates.

In various examples a single application ID may be linked to two devices (e.g. the computing device 102 and the hardware live tile 106), as in the example described with reference to FIG. 3. In other examples, however, there may be more than two devices linked via an application ID and displaying status update information for the same application, where the set of linked devices may comprise one or more computing devices and one or more hardware live tiles. The system 400 in FIG. 4 comprises three devices which each display the same status update information for an application in a tile 104, 116, 404. These three devices are the computing device 102, the hardware live tile 106 and a further computing device which in this example is a smartphone 402. In this example, both the computing device 102 and the smartphone 402 have installed the application client 103, 403; however the application client 103, 403 may be running or may be closed/asleep on either/both devices. When the proxy device 118 receives status update information (e.g. from the application service 124) in this system 400, it sends status update information to each of the three devices 102, 106, 402 and each of the three devices are associated with the same application ID within the proxy device 118.

Figure 4:
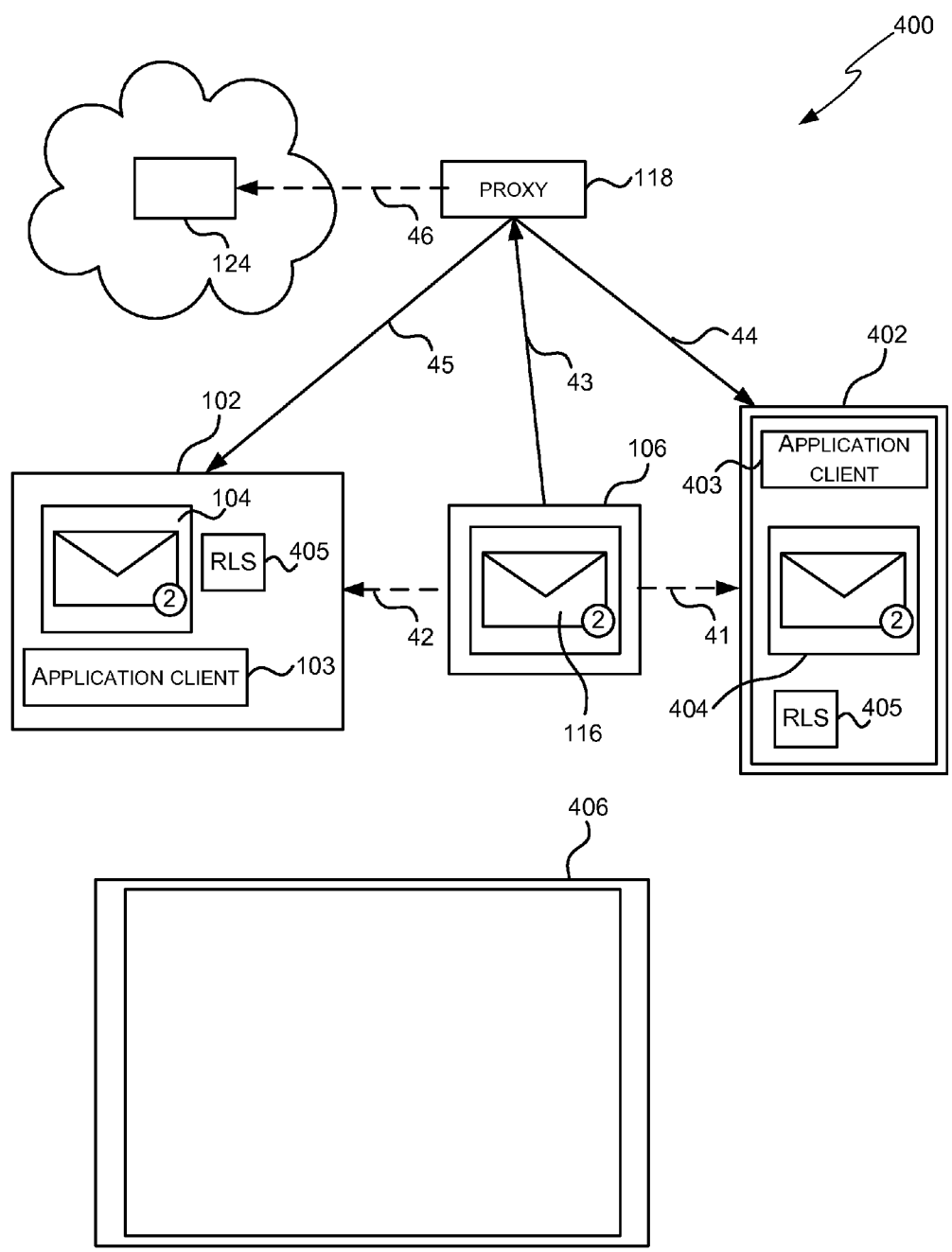
FIG. 4 is a schematic diagram of another example system which provides status update information for applications.

In the system 400 shown in FIG. 4, when a user interaction is received at the hardware live tile 106 (e.g. as in block 302 in FIG. 3), the trigger signal may be transmitted to both the other devices 102, 402 as they may both be considered "master" devices (as they run the application) and as described above, the trigger signal may be sent directly (arrows 41-42) or via the proxy device 118 (arrows 43-45) and in some cases the application service 124 (arrows 43 and 46). In other examples, however, the method may comprise an additional operation of selecting a master device (block 308) and this selection operation may be performed by the hardware live tile 106 or the proxy device 118 (e.g. where this is involved in transmitting the trigger signal) and as a result the selection operation may occur before or after the trigger signal has been transmitted by the hardware live tile 106.

In a first example, the hardware live tile 106 receives the user input (block 302), identifies a master computing device (block 308) and then transmits the trigger signal to the selected master computing device (in block 304) either directly (arrow 41 or 42) or via the proxy device 118 (arrows 43 and 44 or arrows 43 and 45). In a second example, the hardware live tile 106 receives the user input (block 302) and transmits the trigger signal to the proxy device 118 (block 304, arrow 43). The proxy device 118 identifies the master computing device (in block 308) before forwarding on the trigger signal (arrow 44 or 45). In some instances, the proxy device 118 may have predetermined and stored information identifying the master computing device associated with each application ID (or there may be a default master computing device, e.g. in a system such as the one shown in FIG. 1) or alternatively the proxy device 118 may make this determination dynamically (as part of block 308), e.g. following receipt of the trigger signal (arrow 43).

The identification (or selection) of a master computing device (in block 308) may be based on many different factors and examples include, but are not limited to, user preference (e.g. the user specifies which of their computing devices is the "master"), user history (e.g. which device the user has used most recently or uses most often) or user input, processing capability (e.g. speed/memory/cost), available resources (e.g. in terms of processing power, available memory, battery power, etc) or proximity. Any assessment of proximity may relate to physical location or relative location of devices (e.g. distance between the hardware live tile and the candidate device) and/or network connectivity of devices (e.g. a hardware live tile may be considered proximate to a candidate device if there is good network connectivity between the two, where network connectivity may, for example, be assessed based on latency, bandwidth and/or cost). It will be appreciated that in some examples, more than one of these factors may be used, as described in more detail below with reference to FIG. 5.

Figure 5:
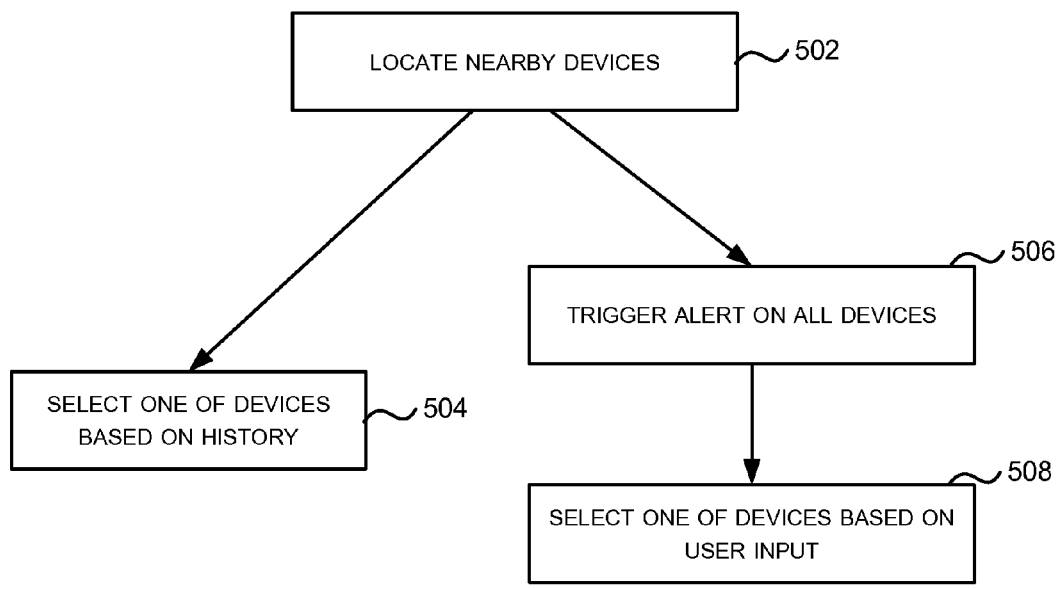
FIG. 5 is a flow diagram showing example methods of selecting a master computing device.

FIG. 5 is a flow diagram showing example methods of selecting a master computing device (e.g. as in block 308 of FIG. 3) and these methods may be used by the hardware live tile 106 or the proxy device 118 depending upon the particular implementation (e.g. depending upon which element implements block 308). Alternatively, different operations within the method may be performed by different devices (e.g. where identifying a candidate set of devices is performed by the proxy device 118 and the selection of a master device from that candidate set is performed by the hardware live tile 106) or operations within the method may be performed by a plurality of devices working together.

Both example methods in FIG. 5 comprise locating a set of nearby devices (block 502), where these nearby devices are in proximity to the hardware live tile 106 where the user interaction occurred (i.e. the hardware live tile that received the user input in block 302) and also have the relevant application client (i.e. the application client to which the trigger signal relates) installed (although not necessarily running). As described above, proximity may relate to relative location and/or network connectivity. Where the method is implemented at the proxy device 118, those devices which have the relevant application client installed may be identified as those devices associated with the same application ID. Similarly, compatible devices (i.e. those with the relevant application client installed) may be identified by the proxy device 118 and nearby devices may be identified by the hardware live tile 106 such that the location of nearby devices (in block 502) is performed by both devices 118, 106 working together. Any suitable method may be used to identify nearby devices and examples include proximity detection (e.g. using local networking) and filtering based on location information provided by the devices themselves.

Having identified a set of nearby devices (in block 502), one of the set of devices may be selected (in block 504) as the master computing device based on user history, e.g.

based on which device in the set the user interacted with most recently or which device in the set the user interacts with most frequently, etc. In another example method, the selection of a master computing device from the candidate set (identified in block 502) may be based on user input. Where user input is used, an alert may be triggered on all the identified nearby devices (block 506) and this alert take any form. In an example, each nearby device (i.e. each device in the candidate set identified in block 502) may vibrate, make a sound and/or display an alert. This alerts the user who can interact with one of the devices (e.g. by switching on the display or pressing a button) and the master device is identified based on which device the user interacts with following the alert, i.e. the master computing device is selected based on a user input received at one of the set of nearby devices (block 508). This enables a user to select a convenient device on which to launch the application any view any additional status information.

In a first example implementation of this method which involves user input, the user-selected device (as identified in block 508) signals the other nearby devices to stop buzzing (or otherwise alerting the user) through the proxy device 118. In a second example implementation, the user-selected device signals the hardware live tile 106 which signals the other devices. In a third example implementation, the user-selected device itself signals the other devices, e.g. through a "party channel" shared signaling mechanism set up for that purpose. This may be done with IP multicast, or with cloud services such as Microsoft® Windows Azure™. A fourth example implementation may not use signaling but instead the other devices just time out. This may be appropriate if the notification is not persistent (e.g. if the devices vibrate once and then stop, rather than constantly buzzing/making a noise).

In the examples described above with respect to FIGS. 4 and 5, the trigger signal may be sent (in block 304) to all devices associated with an application ID or to a selected master computing device, where all the candidate devices have the application client installed (but not necessarily running). In some further examples, however, the candidate set of devices (e.g. as identified in block 502) may be broadened to include those devices which do not currently have the application client installed but have the capability to install the application client, e.g. they have an internet connection and access to an appropriate application store or the application client has already been downloaded to the device but not yet installed. In FIG. 4, the set of candidate nearby devices may therefore also include a smart television 406 which does not have the application installed and is not currently displaying a tile showing status update information (unlike the smartphone 402 which is displaying such a tile 404 and has been associated with the same application ID in the proxy device 118).

The interaction methods described herein may, therefore, be used by a user to trigger the installation and launching of an application client on a new device (e.g. on a large display device or other convenient device). This interaction method reduces the number of user operations to a few simple interactions (e.g. one on the hardware live tile and a second on the device following the alert).

Figure 6:
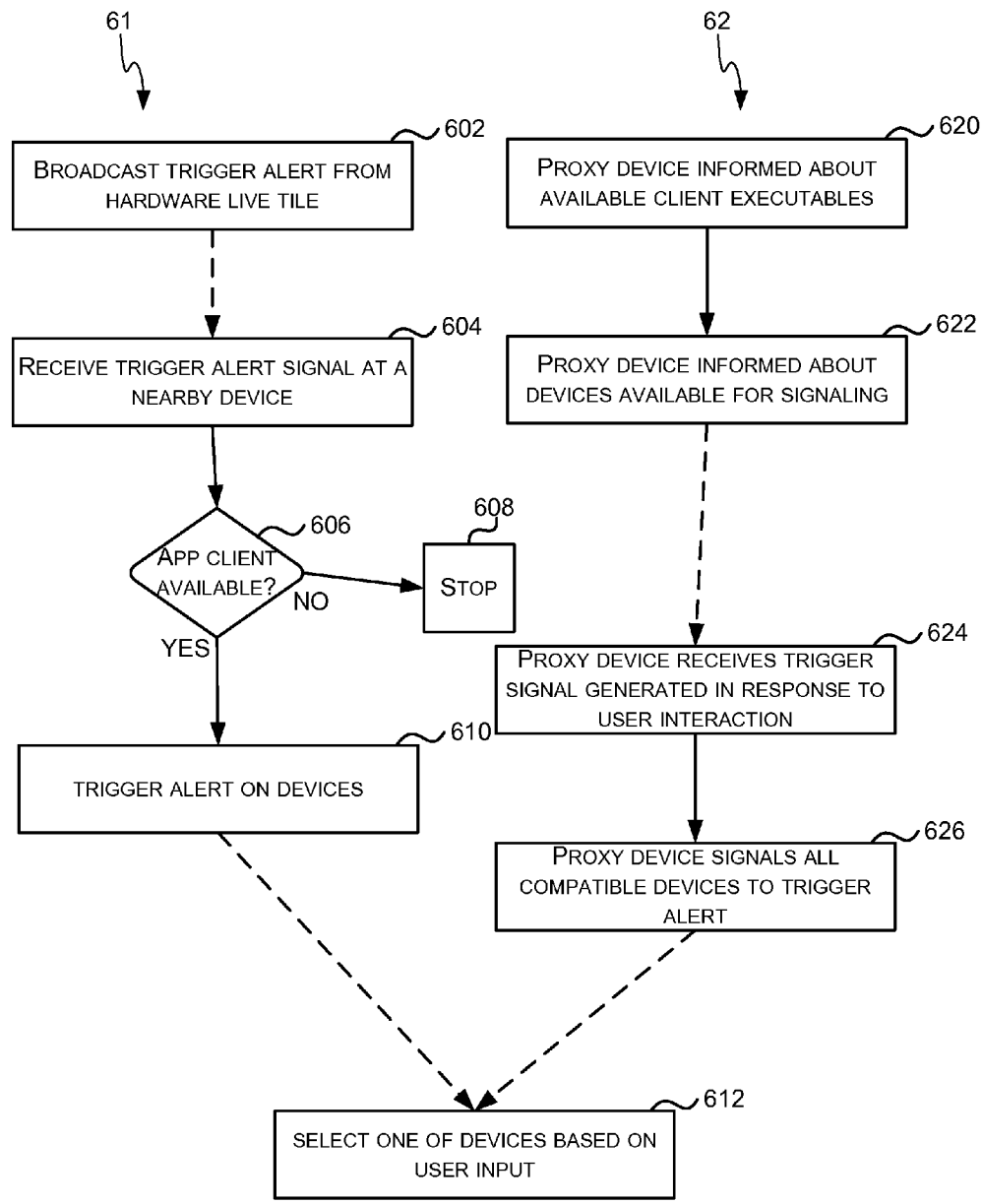
FIG. 6 shows flow diagrams of two further example methods of selecting a master computing device.

FIG. 6 shows two flow diagrams 61, 62 of further example methods of selecting a master computing device (e.g. as in block 308 of FIG. 3). In the first flow diagram 61, an alert trigger signal is broadcast by the hardware live tile 106 (block 602). On receipt of this alert trigger signal at a nearby device (block 604), an alert is triggered on that device (in block 610) only if the application client is available (i.e. installed or available for installation) on the nearby device ('Yes' in block 606). If, however, the application client is not available ('No' in block 606), the alert is not triggered and the device takes no further action in response to receiving the trigger alert signal (block 608). As described above, the alert (triggered in block 610) may take any form (e.g. tactile, audible, visual) and in response to a user input received on one of the nearby devices, that device is selected as the master computing device (block 612).

In the second flow diagram 62, the proxy device 118 is informed by the application service 124 about client executables for a number of different platforms (block 620). The proxy device 118 is also informed by devices (e.g. devices 102, 402, 406 in FIG. 4) of their availability for signaling (block 622). In this method, instead of application independently connecting to the proxy device 118 (to maintain an open channel), a central software element on the device may connect to the proxy device 118 and provide an open channel for any application clients running on the device.

When a user interaction is received at a hardware live tile 106, the hardware live tile 106 signals the proxy device 118 to notify it that it has been interacted with (block 624). The proxy device 118 then signals all compatible devices (block 626), including those without the application client currently installed but for which the application service 124 has provided an executable compatible with the hardware of that device, to show a user interface (UI) element indicating that that tile can be "accepted" here. This UI element may be the sole alert which is triggered, or there may also be an audible or vibrating alert. As with the first flow diagram, one of the devices is then selected based on user input (block 612).

As described above, once a device is selected (using either method shown in FIG. 6), the application client is installed if it is not already installed, the application client is launched and provided with interaction context (e.g. the user input on the hardware live tile, and the content being shown on the live tile during the input) so the application client can go straight to the relevant content.

Although the systems described above comprise a single hardware live tile 106, it will be appreciated that a system may comprise more than one hardware live tile and that these different hardware live tiles may display tiles which relate to the same and/or different applications as the other hardware live tiles in the system. There may also be more than one proxy device 118 in a system. Where there are multiple hardware live tiles in a system, the hardware live tiles and/or the proxy device(s) sending them information may cooperate such that nearby hardware live tiles (e.g. co-located hardware live tiles) are used to display information that is complementary instead of displaying the same status information on two proximate hardware live tiles.

The association methods and interaction methods described above (with reference to FIGS. 2 and 3-6 respectively) relate to systems which comprise at least one hardware live tile 106 which comprises low end hardware that is incapable of running application clients. The association methods and interaction methods may also be applied in systems where all the devices are capable of running the application clients in order to associate multiple computing devices (e.g. multiple instances of computing device 102) with the same application ID and/or to trigger the launching of the application client on one device as a result of user interaction with an application tile for the application on another device. An example of such a system 700 is shown in FIG. 7 which comprises three computing devices 702-706 which each have an application client 103 installed (e.g. an email application client) and display a tile 708-712 which shows status update information.

The association method may be implemented as described above, with one of the devices 704 acting as a master and transmitting information received from the other devices (arrows 71-72) to the proxy device 118 (arrow 73) in order to associate all the devices with the same application ID. Alternatively the association may be performed automatically by the proxy device 118 as a result of the same user creating a tile for the same application (and hence requesting an application ID from the proxy device 118 for the same application) on multiple devices.

The interaction methods described above may also be implemented in the system 700, with a user interaction with one tile 710 causing the sending of trigger signals to one or both of the other devices (e.g. directly, arrows 71-72, or via the proxy device, arrows 73-75) to cause the application client 103 to launch on the receiving device. As described above, in some examples, the trigger signal may be transmitted to a single master computing device (rather than both the other devices 702, 706) and this master computing device may be selected based on one or more factors, such as the proximity to the device 704 with which the user interacts and may be based on user input on one device following alert signals generated on a candidate set of devices.

Figure 7:
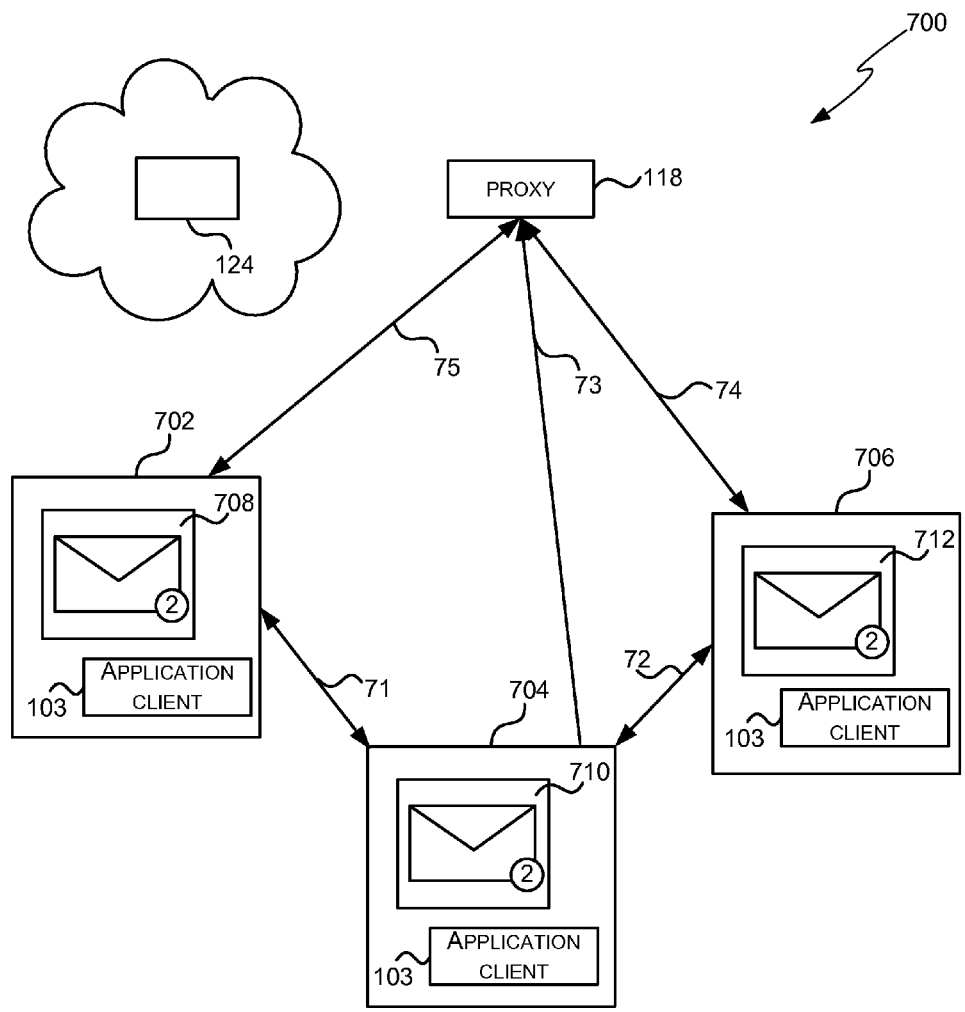
FIG. 7 is a schematic diagram of a further example system which provides status update information for applications.

The interaction methods described with respect to the system 700 in FIG. 7 may, for example, be used to trigger the launching of an application client on a smartphone when a user interacts with a corresponding tile on a tablet computer.

Figure 8:
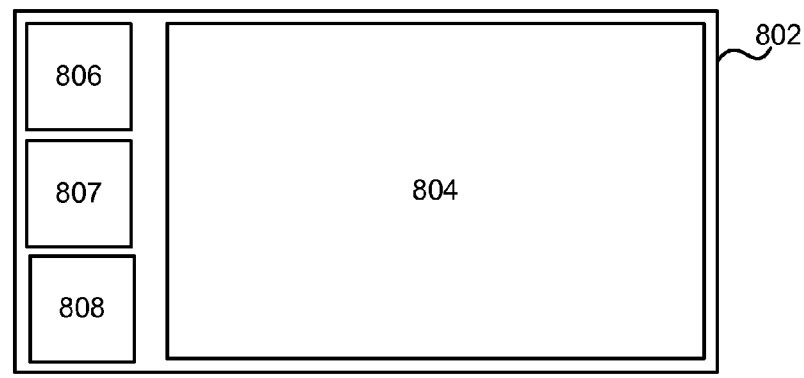
FIG. 8 shows schematic diagrams of various hardware live tiles.
Figure 8:
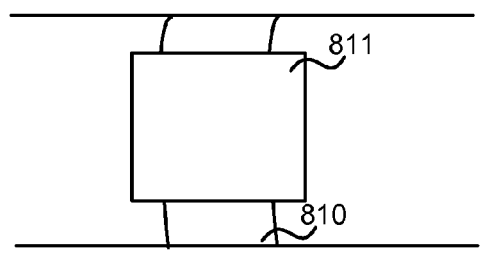
Figure 8:
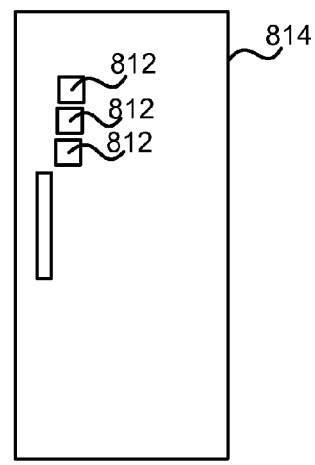

The hardware live tiles may be provided in any form factor and various examples are shown in FIG. 8. The first examples shows a docking station 802 which provides spaces for a user to locate a master computing device 804 (e.g. a smartphone) and one or more hardware live tiles 806-808. When located in the docking station 802 (e.g. attached using magnets in either the docking station or the hardware live tile), the hardware live tile may be able to perform the association methods describe above and/or charge any battery within the hardware live tile. The second example shows a watch 810 which comprises a hardware live tile 811 and the third example shows the hardware live tiles 812 as situated displays, e.g. on a kitchen appliance 814. As shown in this third example, multiple hardware live tiles may be displayed in the same place, or only one may be used, in order to provide any form of small situated display.

The hardware live tile described herein is a separate, small device which may be remote from the master computing device, and which provides a small display for rendering status update information. The impoverished hardware (in terms of processor, memory and/or battery) results in a device which cannot run full applications (or application clients) but can render strings/image files and consequently may be used to display status information for applications running elsewhere (e.g. on a master computing device and/or in the cloud). An example hardware live tile runs a single executable which is a notification UI which is configured to show data from one or more remote sources (e.g. status information from application services) and which can trigger launch of other related software (e.g. application clients) on related devices.

The hardware live tiles described above comprise a display (e.g. display 110 in FIG. 1) for displaying status information for one or more applications. In some examples, there may be additional tile devices of a similar or identical form factor which instead of providing an output (in the form of a display) receive inputs and these may be referred to as 'capturing tiles'. An example of a capturing tile comprises a camera arranged to capture still images or video clips. Where such capturing tiles are provided, these may be co-located with hardware live tiles (e.g. in a docking station 802 or on a kitchen appliance 814) to provide composite devices with enhanced capabilities (e.g. a hardware live tile and a capturing tile comprising a camera may be paired to provide a composite device that can be used for receiving video calls). In such examples, the capturing tile may be provided with additional resources (e.g. increased processing capability) compared to the hardware live tile, in order to implement this composite device functionality.

Figure 9:
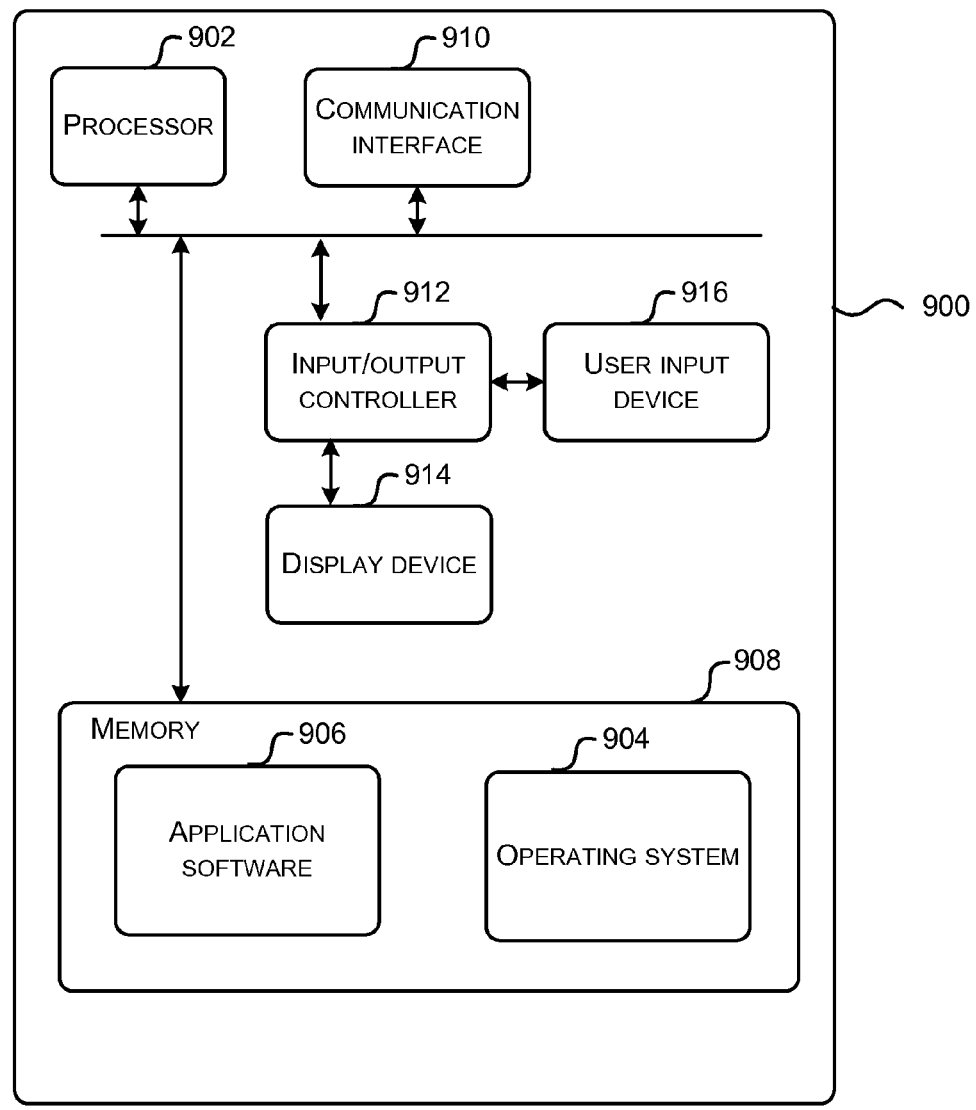
FIG. 9 illustrates an exemplary computing-based device in which embodiments of the methods described herein may be implemented.

FIG. 9 illustrates various components of an exemplary computing-based device 900 which may be implemented as any form of a computing and/or electronic device, and in which embodiments of the methods described herein may be implemented. In particular, this computing-based device 900 may operate as a computing device 102 (which may be a master computing device) or a proxy device 118.

Computing-based device 900 comprises one or more processors 902 which may be microprocessors, controllers or any other suitable type of processors for processing computer executable instructions to control the operation of the device in order to perform aspects of the association and/or interaction methods described above. In some examples, for example where a system on a chip architecture is used, the processors 902 may include one or more fixed function blocks (also referred to as accelerators) which implement a part of the method of association/interaction in hardware (rather than software or firmware). Platform software comprising an operating system 904 or any other suitable platform software may be provided at the computing-based device to enable application software 906 to be executed on the device.

Where the computing-based device 900 operates as a proxy device, the application software 906 may comprise software for generating application IDs, software arranged to link devices with application IDs and/or software for selecting a master computing device from a candidate set of devices. Where the computing-based device 900 operates as a computing device 102, the application software 906 comprises the application for which a tile is generated.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions may be provided using any computer-readable media that is accessible by computing based device 900. Computer-readable media may include, for example, computer storage media such as memory 908 and communications media. Computer storage media, such as memory 908, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 908) is shown within the computing-based device 900 it will be appreciated that the storage may be distributed or located remotely and accessed via a network or other communication link (e.g. using communication interface 910).

Where the computing-based device 900 operates as a proxy device 118, the memory 908 may further be arranged to store data on devices which are associated with each application ID generated by the proxy device.

The computing-based device 900 may also comprises an input/output controller 912 arranged to output display information to a display device 914 which may be separate from or integral to the computing-based device 900. The display information may provide a graphical user interface. The input/output controller 912 may also be arranged to receive and process input from one or more devices, such as a user input device 916 (e.g. a mouse, keyboard, camera, microphone or other sensor). In some examples the user input device 916 may detect voice input, user gestures or other user actions and may provide a natural user interface (NUI). This user input may, for example, be used to respond follow an alert (e.g. in the method of FIG. 5 or 6). In an embodiment the display device 914 may also act as the user input device 916 if it is a touch sensitive display device. The input/output controller 912 may also output data to devices other than the display device, e.g. a locally connected printing device (not shown in FIG. 9).

Any of the input/output controller 912, display device 914 and the user input device 916 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a system which comprises a proxy device 118, the system described is provided as an example and not a limitation. As those skilled in the art will appreciate, the present examples are suitable for application in a variety of different types of systems which provide status update information to devices from a central entity and in other examples, this status information may be pulled by these devices (e.g. the computing device 102 and hardware live tile 106), rather than being pushed as in the examples described above.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   displaying, at an impoverished device, a user interface element representative of dynamic status information associated with an active application;
   receiving, at the impoverished device, a user input for an application client associated with the active application and associated with the displayed dynamic status information for the active application;
   generating, at the impoverished device, a trigger signal based on the received user input for the application client; and
   transmitting the trigger signal to a separate computing device, wherein the trigger signal is arranged to cause launching of the application client for the active application on the separate computing device and to provide the user input received at the impoverished device to the launched application client, wherein the application client for the application is configured to interact with the active application at a cloud-based application service based on the user input received at the impoverished device.

2. A method according to claim 1, further comprising:
   identifying a master computing device from a candidate set of computing devices; and
   wherein the trigger signal is transmitted to the master computing device.

3. A method according to claim 2, wherein identifying a master computing device from a candidate set of computing devices comprises:
   identifying a candidate set of computing devices based on proximity; and
   selecting one of the candidate set of computing devices.

4. A method according to claim 2, wherein identifying a master computing device from a candidate set of computing devices comprises:
   identifying a candidate set of computing devices based on device location;
   triggering an alert on each of the candidate set of devices; and
   selecting one of the candidate set of computing devices based on user input on one of the candidate set of computing devices.

5. A method according to claim 4, wherein the alert is terminated on each of the candidate devices in response to the user input on one of the candidate set of computing devices.

6. A method according to claim 1, wherein the trigger signal is transmitted from a device comprising the impoverished device to the computing device.

7. A method according to claim 1, wherein the trigger signal is transmitted from the impoverished device to the computing device via a proxy device.

8. A method according to claim 1, wherein an association between the user input and the impoverished device is facilitated by authorization information including a code, the code being a QR code or barcode, the code being displayed on the impoverished device in response to the user input, the code manually entered by the user, or the code generated automatically when the impoverished device is turned on.

9. A method according to claim 3, wherein selecting one of the candidate set of computing devices comprises selecting a one of the candidate set of computing devices with the best network connectivity.

10. A system comprising an impoverished device arranged to display status update information for an active application, the impoverished device comprising:
    a display arranged to display a user interface element representative of dynamic status information for the active application;
    a user input device arranged to receive a user input for an application client associated with the active application and associated with the displayed dynamic status information for the active application; and
    a controller configured to generate a trigger signal based on the received user input for the application client; and
    a communication interface arranged to transmit the trigger signal to a separate computing device, wherein the trigger signal is arranged to cause launching of the application client for the active application on the separate computing device and to provide the user input to the launched application client, wherein the application client for the active application is arranged to interact with the active application at a cloud-based application service based on the user input.

11. A system according to claim 10, wherein the trigger signal is transmitted to the separate computing device via a proxy device.

12. A system according to claim 10, wherein the trigger signal is transmitted to a plurality of separate computing devices.

13. A system according to claim 10, further comprising a capturing tile.

14. A system according to claim 10, further comprising a proxy device, wherein the proxy device comprises:
    a processor;
    a communication interface arranged to receive the trigger signal from the impoverished device and to forward the trigger signal to a computing device; and
    a memory arranged to store device executable instructions, which when executed cause the processor to identify a candidate set of computing devices and select a computing device from the candidate set to which the trigger signal is forwarded.

15. A system according to claim 14, wherein the candidate set of computing devices is selected based on proximity of the computing devices to the impoverished device.

16. A system according to claim 14, wherein the computing device is selected from the candidate set based on a user input received at one of the computing devices in the candidate set.

17. A system according to claim 10, comprising at least a second impoverished device controlled to display information complimentary to information displayed on the impoverished device.

18. A system according to claim 10, further comprising the computing device, wherein the computing device comprises:
- a processor;
- a communication interface arranged to receive the trigger signal from the impoverished device or a proxy device; and
- a memory arranged to store device executable instructions, which when executed cause the processor to launch the application client on receipt of the trigger signal and to provide the trigger signal as an input to the application client.

19. A system according to claim 18, wherein the memory in the computing device is further arranged to store device executable instructions, which when executed cause the processor to install the application client prior to launching the application client.

20. A method comprising:
- receiving a trigger signal from an impoverished device, the trigger signal identifying a user interaction with a user interface element displayed at the impoverished device and representative of dynamic status information associated with an active application, the impoverished device being attached to a docking station and the user interaction being a user input for an application client associated with the active application;
- selecting a master computing device from a set of candidate computing devices; and
- transmitting the trigger signal to the master computing device, wherein the trigger signal is arranged to cause launching of the application client for the active application on the master computing device and to provide the user input to the launched application client, wherein the application client for the active application is arranged to interact with the active application at a cloud-based application service based on the user input.

\* \* \* \* \*